United States Patent [19]

Katto

[11] Patent Number: 5,706,055
[45] Date of Patent: Jan. 6, 1998

[54] MOTION COMPENSATED PREDICTIVE PICTURE PRODUCTION APPARATUS

[75] Inventor: Jiro Katto, Tokyo, Japan

[73] Assignee: NEC Corporation, Tokyo, Japan

[21] Appl. No.: 593,463

[22] Filed: Jan. 29, 1996

[30] Foreign Application Priority Data

Jan. 27, 1995 [JP] Japan .................. 7-011607

[51] Int. Cl.$^6$ .................................................. H04N 7/36
[52] U.S. Cl. ............................................. 348/409; 348/416
[58] Field of Search .................................. 348/401, 402, 348/409, 411, 412, 413, 415, 416; 382/236, 241

[56] References Cited

PUBLICATIONS

Nieweglowski et al, "Motion Compensated Video Sequence Interpolation Using Digital Image Warping," ICASSP '94: Acoustics, Speech & Signal Processing Conference.
T. George Campbell, "Very Low Bitrate Video Coder using Warping Prediction", Picture Coding Symposium, Oct., 1993, pp. 167–168.

Hiroyuki Katata et al., "Motion Compensation Scheme in Very Low Bit Rate Video Coding", Picture Coding Symposium, Oct., 1994, pp. 121–122.
Michael T. Orchard et al., "Overlapped Block Motion Compensation: An Estimation–Theoretic Approach", IEEE Transactions on Image Processing 3(5):693–699 (1994).

*Primary Examiner*—Amelia Au
*Attorney, Agent, or Firm*—Foley & Lardner

[57] ABSTRACT

The invention provides a motion compensation predicted picture production apparatus which can produce a motion compensated predictive picture which includes minimized prediction errors. The motion compensated predictive picture production apparatus includes a pair of warping motion compensation circuits which produce, for different first grid point arrangement and second grid point arrangement, motion compensated predictive pictures by warping motion compensation. An averaging circuit averages the two motion compensated predictive pictures outputted from the warping motion compensation circuits to obtain a motion compensated predictive picture. The motion compensated predictive picture is outputted from the averaging circuit as an output of the motion compensated predictive picture production apparatus.

1 Claim, 6 Drawing Sheets

MOTION COMPENSATED PREDICTIVE PICTURE PRODUCTION APPARATUS

BACKGROUND OF THE INVENTION

1. Field of the Invention

This invention relates to a motion compensated predictive picture production apparatus, and more particularly to a motion compensated predictive picture production apparatus which produces a motion compensated predictive picture based on a moving picture.

2. Description of the Related Art

In recent years, a motion compensation prediction system has been and is employed as one of international standard systems for coding a moving picture, and various motion compensation prediction systems have been proposed. One of such proposed motion compensation prediction systems is warping motion compensation. The warping motion compensation is disclosed, for example, in T. G. Campbell, "Very Low Bitrate Video Coder Using Warping Prediction", Picture Coding Symposium, October, 1993, pp.167–168. In the warping motion compensation, perpendicular grid lines are set at equal distances in a screen, and motion vectors at individual grid points are calculated. For each of picture elements other than the grid points, a motion vector is calculated by interpolation from motion vectors of a plurality of neighboring grid points to produce a motion compensated predictive picture.

For example, in warping motion compensation in which three grid points are used, as schematically shown in FIG. 7 in which a reference picture and motion compensated predictive picture are shown, a triangular area on a reference picture which is defined by motion vectors 42 calculated with regard to three grid points 41 is determined as a motion compensated predictive picture. It is to be noted that conventionally known block matching or the like is used for the detection of a motion vector, and affine transform or the like is used for the vector interpolation. Further, as a calculation method for a picture element value for a vector which is not an integral number, linear interpolation based on values of four neighboring pictures is used.

In the warping motion compensation system described above, prediction errors of a moving picture signal caused by rotation, expansion and/or reduction can be reduced remarkably comparing with those of such a motion compensation system which simply involves copying of a block, that is adopted by the international standard system at present.

It is to be noted that, in regard to the selecting way of grid points when warping motion compensation is performed using three grid points, there are two such choices as illustrated in FIGS. 8(a) and 8(b). In the warping motion compensation by T. G. Campbell mentioned above, the selection of grid points is such that one of the two choices is used to produce a motion compensated predictive picture. However, also another selection has been proposed wherein the two choices of grid points are adaptively switched to produce a motion compensated predictive picture. The selection just described is disclosed in Katata et al., "Motion Compensation Scheme in Very Low Bit Rate Video Coding", Picture Coding Symposium, October, 1994, pp.121–122.

Also a motion compensation predictive system called overlapped motion compensation is known. In the overlapped motion compensation, such processing that motion vectors are multiplied by a window function for a reference region cut out with the motion vectors is performed, and such motion vectors of neighboring regions multiplied by the window function are added the motion vectors obtained by the processing to produce a motion compensated predictive picture. One of such overlapped motion compensation systems is disclosed, for example, in M. T. Orchard et al., "Overlapped Block Motion Compensation: An Estimation-Theoretic Approach", IEEE Transaction on Image Processing, Vol. 3, No. 5, pp.693–699. Referring to FIGS. 9(a) and 9(b), according to the overlapped motion compensation system, motion vectors of a region 45 including a block 43 having a predetermined number of picture elements in perpendicular directions as seen in FIG. 9(b) are multiplied by such a diamond-shaped window function as illustrated in FIG. 9(a). Then, to the predicted values obtained by the multiplication, predicted values of a neighboring region (for example, a region 45') obtained by similar multiplication by the window function are added to produce a motion compensated predictive picture.

All of the motion compensation systems described above can reduce prediction errors comparing with the motion compensation system based on blocks, that is adopted as the international standard system at present. However, the reduction in prediction errors is not satisfactory as yet.

SUMMARY OF THE INVENTION

It is an object of the present invention to provide a motion compensation predicted picture production apparatus which can produce a motion compensated predictive picture which includes minimized prediction errors.

In order to attain the object described above, according to an aspect of the present invention, there is provided a motion compensated predictive picture production apparatus, which comprises motion vector detection means for detecting, based on a current picture and a reference picture, motion vectors at individual grid points defined on the pictures, first motion vector calculation means for calculating motion vectors of picture elements other than the picture elements at the grid points by interpolation calculation of the motion vectors regarding three of the grid points around the picture elements defined by a first grid point arrangement, second motion vector calculation means for calculating the motion vector of the picture elements other than the picture elements at the grid points by interpolation calculation of the motion vectors regarding other three of the grid points around the picture elements defined by a second grid point arrangement different from the first grid point arrangement, first motion compensated predictive picture production means for producing a first motion compensated predictive picture based on the motion vectors calculated for the individual picture elements by the first motion vector calculation means, second motion compensated predictive picture production means for producing a second motion compensated predictive picture based on the motion vectors calculated for the individual picture elements by the second motion vector calculation means, and averaging means for averaging the first and second motion compensated predictive pictures produced by the first and second motion compensated predictive picture production means to produce an averaged picture and outputting the averaged picture as a motion compensated predictive picture.

In the motion compensated predictive picture production apparatus, production of a motion compensated predictive picture by warping motion compensation is performed for both of two different grid point arrangements, and two motion compensated predictive pictures thus produced are averaged to obtain an averaged picture to be outputted as a motion compensated predictive picture of the motion compensated predictive picture production apparatus. Consequently, the motion compensated predictive picture production apparatus can perform motion compensation with a high prediction efficiency with minimized prediction errors.

According to another aspect of the present invention, there is provided a motion compensated predictive picture production apparatus, which comprises motion vector detection means for detecting, based on a current picture and a reference picture, motion vectors at individual grid points defined on the pictures, first motion vector calculation means for calculating motion vectors of picture elements other than the picture elements at the grid points by interpolation calculation of the motion vectors regarding three of the grid points around the picture elements defined by a first grid point arrangement, second motion vector calculation means for calculating the motion vector of the picture elements other than the picture elements at the grid points by interpolation calculation of the motion vectors regarding other three of the grid points around the picture elements defined by a second grid point arrangement different from the first grid point arrangement, first motion compensated predictive picture production means for producing a first motion compensated predictive picture based on the motion vectors calculated for the individual picture elements by the first motion vector calculation means, second motion compensated predictive picture production means for producing a second motion compensated predictive picture based on the motion vectors calculated for the individual picture elements by the second motion vector calculation means, averaging means for averaging the first and second motion compensated predictive pictures produced by the first and second motion compensated predictive picture production means to produce a third motion compensated predictive picture, and selection means for receiving the first motion compensated predictive picture produced by the first motion compensated predictive picture production means, the second motion compensated predictive picture produced by the second motion compensated predictive picture production means and the third motion compensated predictive picture produced by the averaging means and selecting, based on the received first, second and third motion compensated predictive pictures, a motion compensated predictive picture to be outputted in units of a small area of the pictures.

In the motion compensated predictive picture production apparatus, from the first motion compensated predictive picture, the second motion compensated predictive picture and the third motion compensated predictive picture obtained by averaging the first and second motion compensated predictive pictures, a motion compensated predictive picture to be outputted is selected in units of a small area of the pictures based on contents of the first, second and third motion compensated predictive pictures. Consequently, the motion compensated predictive picture production apparatus is further advantageous in that prediction errors can be further reduced.

According to a further aspect of the present invention, there is provided a motion compensated predictive picture production apparatus, which comprises motion vector detection means for detecting, based on a current picture and a reference picture, motion vectors at individual grid points defined on the pictures, first motion vector calculation means for calculating motion vectors of picture elements other than the picture elements at the grid points by interpolation calculation of the motion vectors regarding three of the grid points around the picture elements defined by a first grid point arrangement, second motion vector calculation means for calculating the motion vector of the picture elements other than the picture elements at the grid points by interpolation calculation of the motion vectors regarding other three of the grid points around the picture elements defined by a second grid point arrangement different from the first grid point arrangement, first motion compensated predictive picture production means for producing a first motion compensated predictive picture based on the motion vectors calculated for the individual picture elements by the first motion vector calculation means, second motion compensated predictive picture production means for producing a second motion compensated predictive picture based on the motion vectors calculated for the individual picture elements by the second motion vector calculation means, and averaging means for adding a picture obtained by weighting the first motion compensated predictive picture produced by the first motion compensated predictive picture production means in accordance with positions of the picture elements and another picture obtained by weighting the second motion compensated predictive picture produced by the second motion compensated predictive picture production means in accordance with positions of the picture elements and outputting a picture obtained by the addition as a motion compensated predictive picture.

In the motion compensated predictive picture production apparatus, when two motion compensated predictive pictures produced by warping motion compensation are to be averaged, they are weighted in accordance with positions of the picture elements. Consequently, the motion compensated predictive picture production apparatus is further advantageous in that it also exhibits advantages provided by overlapped motion compensation.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

First Embodiment

Figure 1:
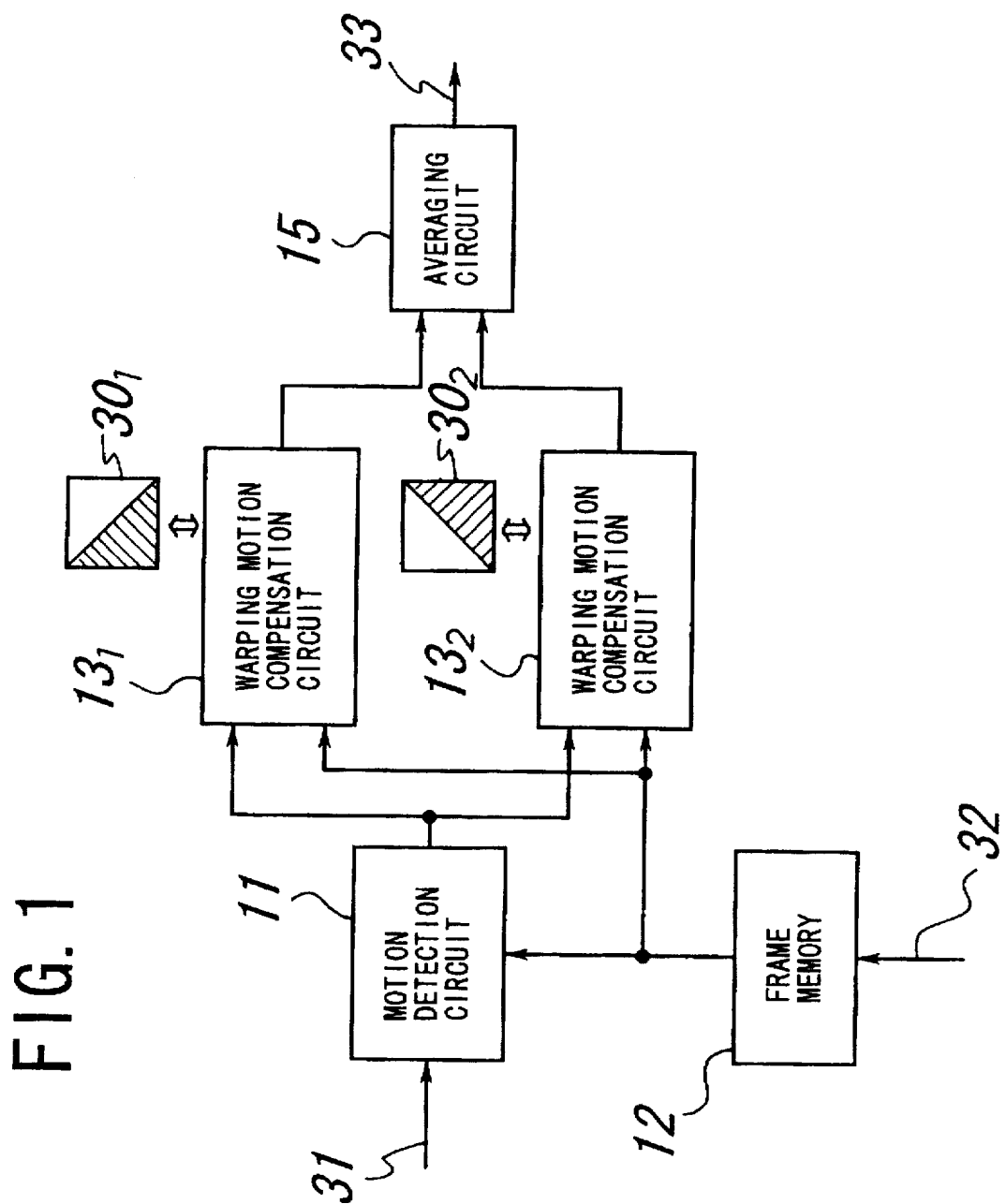
FIG. 1 is a block diagram of a motion compensated predictive picture production apparatus showing a first preferred embodiment of the present invention.

Referring first to FIG. 1, there is shown a motion compensated predictive picture production apparatus according to a first preferred embodiment of the present invention. The motion compensated predictive picture production apparatus shown includes a motion detection circuit 11, a frame memory 12, a pair of warping motion compensation circuits $13_1$ and $13_2$, and an averaging circuit 15.

The motion detection circuit 11 detects motion vectors of predetermined grid points based on a current picture 31 and a reference picture. The frame memory 12 stores a reference picture 32 to be used for motion detection and motion compensation. The reference picture 32 is supplied from the frame memory 12 to the motion detection circuit 11.

The warping motion compensation circuit receives motion vectors and the reference picture from the motion detection circuit 11 and the frame memory 12, respectively, and produces, using the motion vectors and the reference picture, a first motion compensated predictive picture corresponding to a first grid point arrangement $30_1$ for warping motion compensation in which three grid points is used. The warping motion compensation circuit $13_2$ produces a second motion compensated predictive picture corresponding to a second second grid point arrangement $30_2$ different from the first grid point arrangement $30_1$. Each of the warping motion compensation circuits $13_1$ and $13_2$ is formed from a vector interpolation circuit 21 and a predictive picture element interpolation circuit 22 as seen in FIG. 2.

Figure 2:
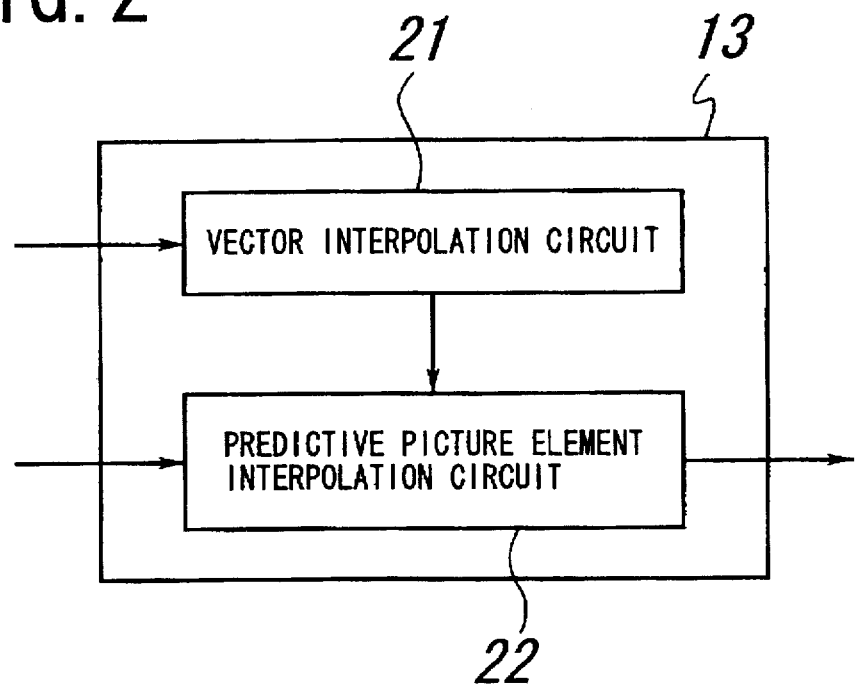
FIG. 2 is a block diagram showing a warping compensation circuit provided in the motion compensated predictive picture production apparatus of FIG. 1.

Referring to FIG. 2, the vector interpolation circuit 21 provided in each of the warping motion compensation circuits $13_1$ and $13_2$ receives motion vectors at three grid points from the motion detection circuit 11 and, using the motion vectors, performs interpolation calculation of motion vectors of picture elements included in the triangle defined by the grid points. The vector interpolation circuit 21 outputs a result of the interpolation calculation. The predictive picture element interpolation circuit 22 receives motion vectors from the vector interpolation circuit 21 and receives, from the frame memory 12, motion vector values of individually four, in the maximum, neighboring picture elements defined by the motion vectors. The predictive picture element interpolation circuit 22 performs interpolation calculation of predictive picture elements using the thus received motion vectors and motion vector values.

The first and second motion compensated predictive pictures outputted from the warping motion compensation circuits $13_1$ and $13_2$ having such a construction as described above are inputted to the averaging circuit 15 shown in FIG. 1.

Figure 3:
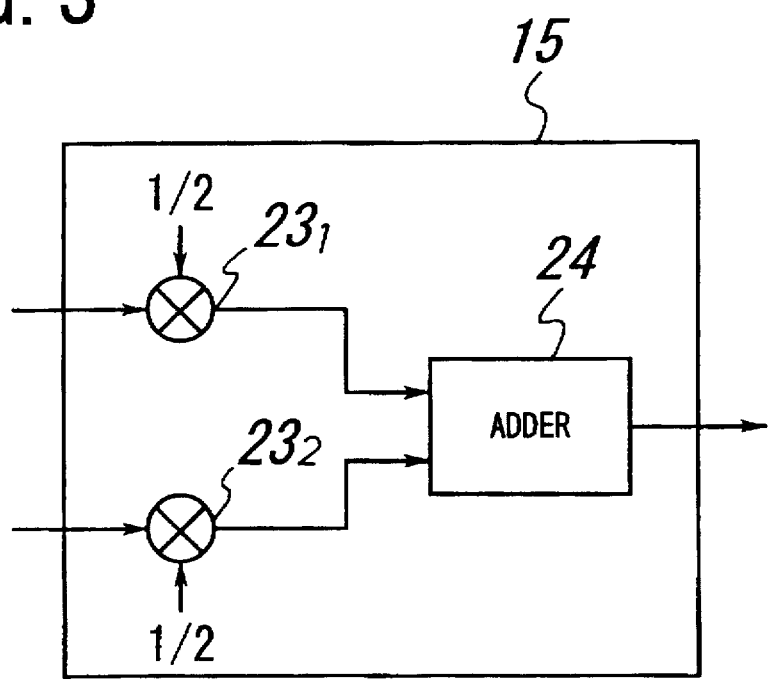
FIG. 3 is a block diagram showing an averaging circuit provided in the motion compensated predictive picture production apparatus of FIG. 1.

Referring to FIG. 3, the averaging circuit 15 is formed from a pair of multipliers $23_1$ and $23_2$ and an adder 24. The first motion compensated predictive picture from the warping motion compensation circuit $13_1$ is multiplied by ½ by the multiplier $23_1$ while the second motion compensated predictive picture from the warping motion compensation circuit $13_2$ is multiplied by ½ by the multiplier $23_2$. The two motion compensated predictive pictures obtained by such multiplications are added by the adder 24, and a resulted motion compensated predictive picture 33 is outputted from the adder 24.

In this manner, in the motion compensated predictive picture production apparatus of the first embodiment described above, an average of two motion compensated predictive pictures predicted based on different grid point arrangements is outputted as a motion compensated predictive picture. Consequently, prediction errors of the thus outputted motion compensated predictive picture are reduced comparing with predictive errors produced by conventional systems as described below.

A motion vector value of a picture element of the current picture is represented by x, a motion vector value of a picture element of the first motion compensated predictive picture outputted from the warping motion compensation circuit $13_1$ is represented by $x_1$, and a motion vector value of a picture element of the second motion compensated predictive picture outputted from the warping motion compensation circuit $13_2$ is represented by $x_2$. Where the contributions of the predicted value by the warping motion compensation circuit $13_1$ and the predictive value by the warping motion compensation circuit $13_2$ are considered to be equal to each other, the correlation coefficients ρ between x and $x_1$ and between x and $x_2$ are considered to be equal to each other, and the following expression (1) stands:

$$\frac{E[x \cdot x_1]}{E[x^2]} = \frac{E[x \cdot x_2]}{E[x^2]} = \rho \tag{1}$$

where $E[\cdot]$ is an expected value.

Here, production of a motion compensated predictive picture using only one of the warping motion compensation circuits is considered here. In this instance, the dispersion of prediction errors can be represented by the following expression (2):

$$2(1-\rho) \cdot E[x^2] \tag{2}$$

On the other hand, where an average of expected values of the two warping motion compensation circuits is taken as in the embodiment described above, the dispersion of predictive errors is represented by the following expression (3):

$$\frac{1}{2}(3-4\rho+\rho') \cdot E[x^2] \tag{3}$$

where ρ' is a correlation coefficient between $x_1$ and $x_2$ represented by the following expression (4):

$$\rho' = \frac{E[x_1 \cdot x_2]}{E[x^2]} \tag{4}$$

By subtracting the expression (4) from the expression (2), "$(1-\rho')E[x^2]/2$" is obtained. Accordingly, where different methods are used for prediction of two predicted values (that is, where ρ' is smaller than 1) as in the motion compensated predictive picture production apparatus of the first embodiment described above, a reduction effect of predictive errors can always be obtained by averaging processing.

Second Embodiment

Figure 4:
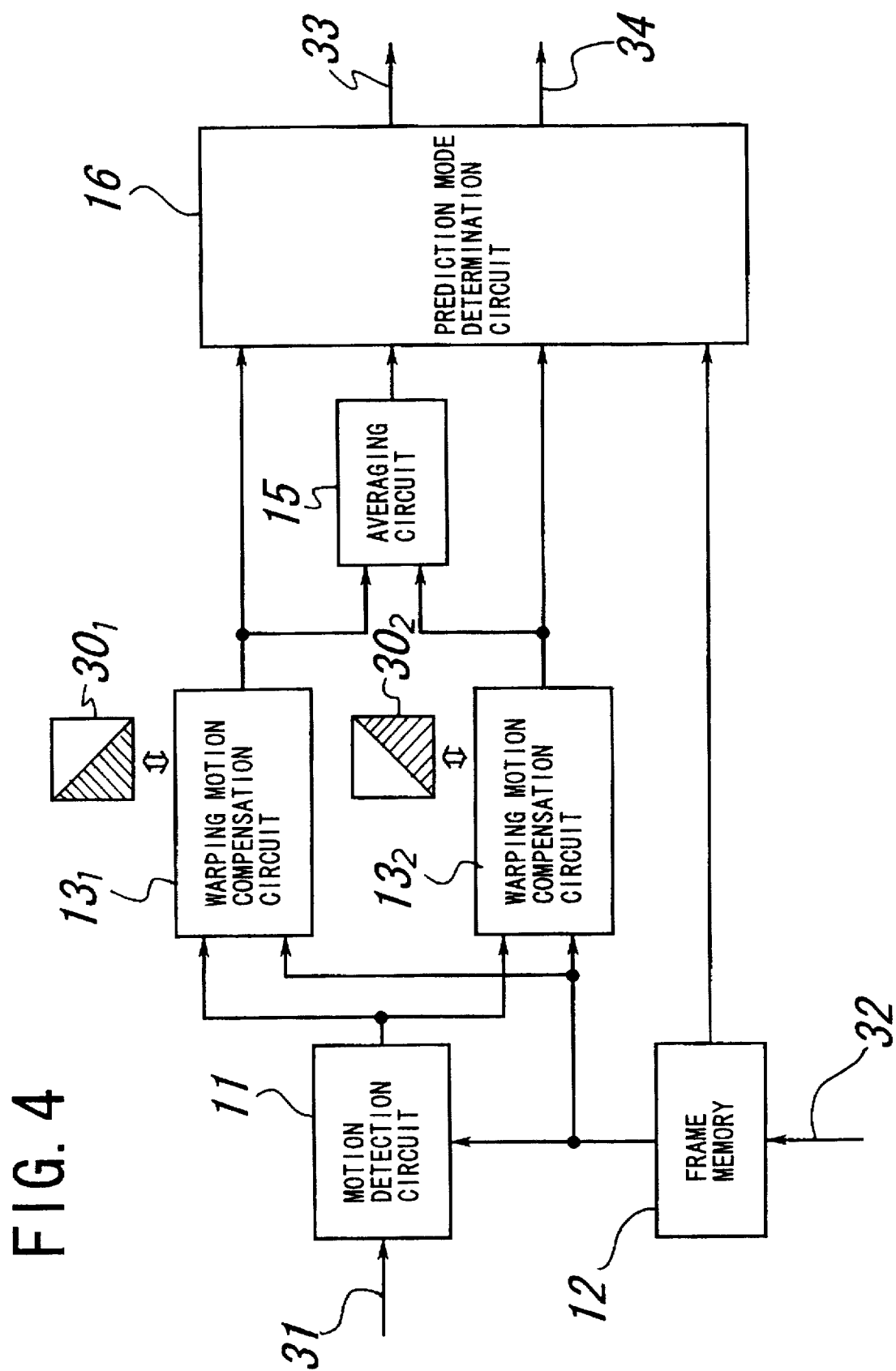
FIG. 4 is a block diagram of another motion compensated predictive picture production apparatus showing a second preferred embodiment of the present invention.

Referring now to FIG. 4, there is shown in block diagram a motion compensated predictive picture production apparatus of a second preferred embodiment of the present invention. The present motion compensated predictive picture production apparatus is a modification to but is different from the motion compensated predictive picture production apparatus of the first embodiment in that it additionally includes a prediction mode determination circuit 16. The prediction mode determination circuit 16 receives a reference picture from the frame memory 12, motion compensated predictive pictures from the warping motion compensation circuits $13_1$ and $13_2$ and a further motion compensated predictive picture from the averaging circuit 15. The prediction mode determination circuit 16 selects one of the three received motion compensated predictive pictures adaptively in units of a small area in such a manner that it selectively outputs, for example, one of the motion compensated predictive pictures which is nearest to the reference picture from the frame memory 12. The prediction mode determination circuit 16 outputs a thus selected motion compensated predictive picture 33 and a motion compensation prediction mode 34.

In this manner, in the motion compensated predictive picture production apparatus of the second embodiment, since a single motion compensated predictive picture is adaptively selected in units of a small area from a plurality of motion compensated predictive pictures, predictive errors of the entire picture can be further reduced.

Third Embodiment

A motion compensated predictive picture production apparatus of a third embodiment of the present invention is a modification to and is different from the motion compensated predictive picture production apparatus of the first embodiment only in that it includes a weighted averaging circuit for performing weighted averaging in place of the averaging circuit 15 provided in the motion compensated predictive picture production apparatus of the first embodiment. Therefore, description of a general construction of the motion compensated predictive picture production apparatus of the present embodiment is omitted herein to avoid redundancy.

Figure 5:
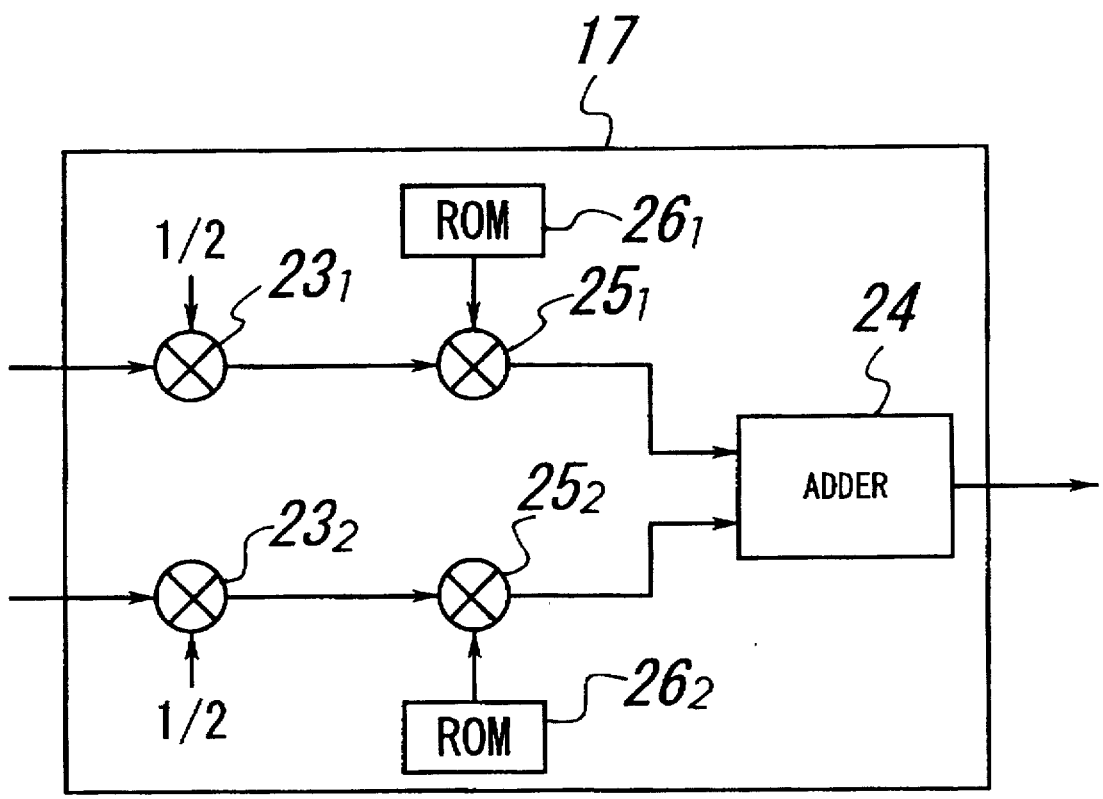
FIG. 5 is a block diagram showing an averaging circuit provided in a further motion compensated predictive picture production apparatus as a third preferred embodiment of the present invention.

FIG. 5 shows in block diagram the weighted averaging circuit provided in the motion compensated predictive picture production apparatus of the third embodiment. The weighted averaging circuit shown is generally denoted at 17 and includes, in addition to the components of the averaging circuit shown in FIG. 3, a pair of multipliers $25_1$ and $25_2$ and a pair of read only memories (ROMs) $26_1$ and $26_2$. The read only memories $26_1$ and $26_2$ store weighting values of a window function corresponding to the positions of picture elements with respect to grid points.

In particular, in the motion compensated predictive picture production apparatus of the third embodiment, two motion compensated predictive pictures inputted from the two warping motion compensation circuits are multiplied by ½ by the multipliers $23_1$ and $23_2$, and then multiplied by corresponding weighting values stored in the read only memories $26_1$ and $26_2$ by the multipliers $25_1$ and $25_2$, respectively. The outputs of the multipliers $25_1$ and $25_2$ are added by the adder 24, and a result of the addition is outputted from the adder 24.

Figure 6:
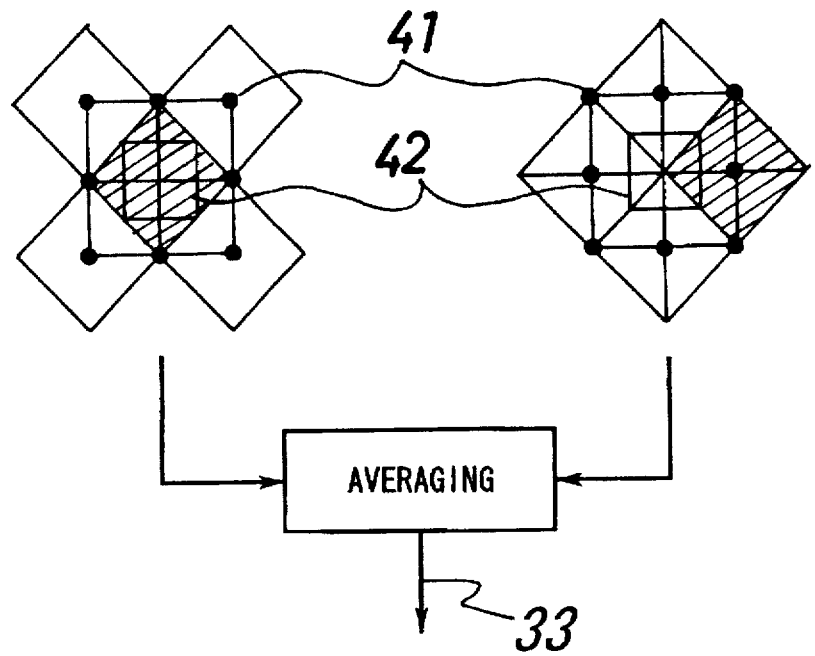
FIG. 6 is a diagrammatic view illustrating an outline of averaging processing of the motion compensated predictive picture production apparatus of the third embodiment of the present invention.
Figure 7:
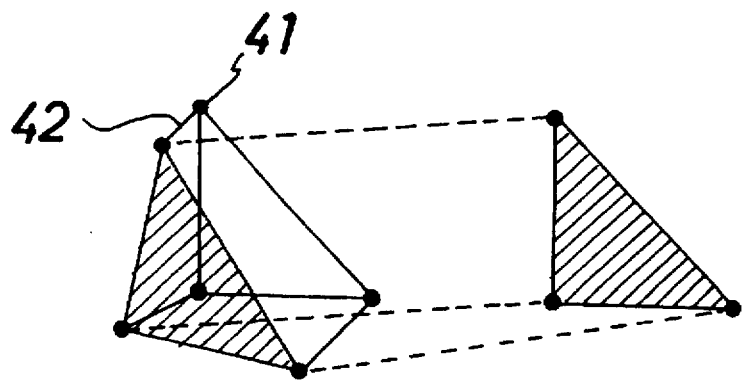
FIGS. 7 is a diagrammatic view illustrating an outline of conventional warping motion compensation.
Figure 8A:
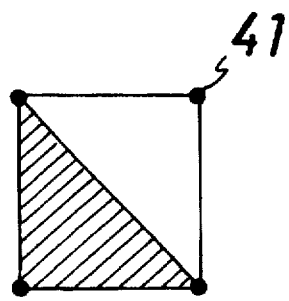
FIGS. 8(a) and 8(b) are diagrammatic views illustrating arrangements of grid points which can be utilized in warping motion compensation.
Figure 8B:
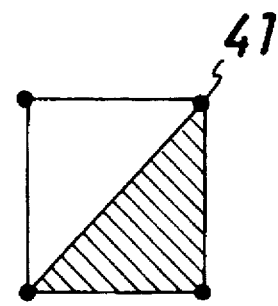
Figure 9A:
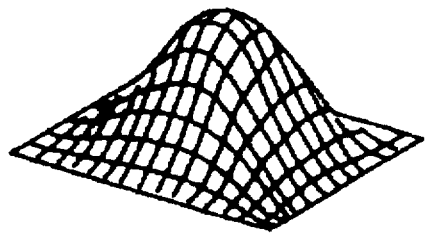
FIGS. 9(a) and 9(b) are schematic views illustrating an outline of conventional overlapped motion compensation in which a diamond-shaped window function is used.
Figure 9B:
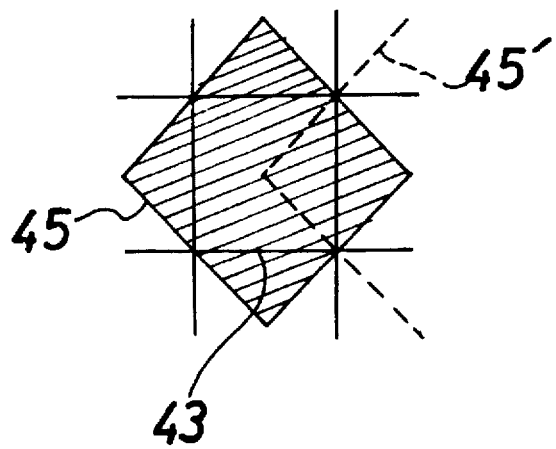

In this manner, in the motion compensated predictive picture production apparatus of the third embodiment, a first motion compensated predictive picture and a second motion compensated predictive picture produced by warping motion compensation are processed by processing substantially equivalent to the conventional overlapped motion compensation (refer to FIG. 9) in which a diamond-shaped window function is utilized, as seen from FIG. 6. Consequently, motion compensation which exhibits the advantages of both of warping motion compensation and overlapped motion compensation can be realized.

Having now fully described the invention, it will be apparent to one of ordinary skill in the art that many changes and modifications can be made thereto without departing from the spirit and scope of the invention as set forth herein.

What is claimed is:

1. A motion compensated predictive picture production apparatus, comprising:

motion vector detection means for detecting, based on a current picture and a reference picture, an original set of motion vectors at individual grid points defined on the current picture and the reference picture;

first motion vector calculation means for calculating a first set of motion vectors of picture elements, other than the picture elements at the individual grid points, by interpolation calculation of the original set of motion vectors regarding three of the individual grid points around the picture elements defined by a first individual grid point arrangement;

second motion vector calculation means for calculating a second set of motion vectors of the picture elements, other than the picture elements at the individual grid points, by interpolation calculation of the original set of motion vectors regarding another three of the individual grid points around the picture elements defined by a second individual grid point arrangement different from the first individual grid point arrangement;

first motion compensated predictive picture production means for producing a first motion compensated predictive picture based on the first set of motion vectors calculated for the picture elements by said first motion vector calculation means;

second motion compensated predictive picture production means for producing a second motion compensated predictive picture based on the second set of motion vectors calculated for the picture elements by said second motion vector calculation means; and averaging means for averaging the first motion compensated predictive picture and the second motion compensated predictive picture produced by said first compensated predictive picture production means and said second motion compensated predictive picture production means to produce an averaged picture, and for outputting the averaged picture as a motion compensated predictive picture.

* * * * *